United States Patent
Shimozono et al.

(10) Patent No.: US 7,054,266 B2
(45) Date of Patent: May 30, 2006

(54) SWITCH PROVIDED WITH CAPABILITY OF SWITCHING A PATH

(75) Inventors: Norio Shimozono, Machida (JP); Naoko Iwami, Sagamihara (JP); Kiyoshi Honda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 245 days.

(21) Appl. No.: 10/649,663

(22) Filed: Aug. 28, 2003

(65) Prior Publication Data
US 2005/0025045 A1   Feb. 3, 2005

(30) Foreign Application Priority Data
Jul. 30, 2003   (JP)   ............... 2003-203454

(51) Int. Cl.
   *G01R 31/08*   (2006.01)
   *G06F 3/00*   (2006.01)
(52) U.S. Cl. .................... 370/227; 370/228
(58) Field of Classification Search ............ None
   See application file for complete search history.

(56) References Cited

U.S. PATENT DOCUMENTS

| | | | |
|---|---|---|---|
| 5,289,461 A * | 2/1994 | de Nijs | 370/360 |
| 6,128,750 A * | 10/2000 | Espy et al. | 714/7 |
| 6,260,158 B1 | 7/2001 | Purcell et al. | |
| 6,571,355 B1 | 5/2003 | Linnell | |
| 6,687,758 B1 | 2/2004 | Craft et al. | |
| 6,701,411 B1 | 3/2004 | Matsunami et al. | |
| 6,775,230 B1 | 8/2004 | Watanabe et al. | |
| 6,831,920 B1 * | 12/2004 | Uchida | 370/399 |
| 2002/0154625 A1 * | 10/2002 | Ma | 370/351 |
| 2004/0114588 A1 | 6/2004 | Bhaskaran | |
| 2004/0151174 A1 * | 8/2004 | Del Signore et al. | 370/389 |
| 2005/0021751 A1 * | 1/2005 | Block et al. | 709/225 |

FOREIGN PATENT DOCUMENTS

| | | |
|---|---|---|
| EP | 889410 | 1/1999 |
| JP | 10-021016 | 1/1998 |

* cited by examiner

*Primary Examiner*—Chau Nguyen
*Assistant Examiner*—Cynthia L. Davis
(74) *Attorney, Agent, or Firm*—Mattingly, Stanger, Malur & Brundidge, P.C.

(57) ABSTRACT

In order to avoid location of a buffer or a cache memory required for recovering a path trouble in the conventional storage unit, a new switch is provided between a computer and a storage unit. This switch manages a command to be relayed thereby, transmits to the computer an error response if the switch detects a trouble, and at a time changes a setting so that the subsequent commands may be transmitted through an alternate path.

5 Claims, 15 Drawing Sheets

SWITCH PROVIDED WITH CAPABILITY OF SWITCHING A PATH

BACKGROUND OF THE INVENTION

The present invention relates to a switch which is used in a network or a switch (referred to as a virtualization switch) which provides a device connected in a network with a virtualized storage and a computer system which includes such a switch.

As a method of enhancing reliability of data transfer between a computer and a storage system, there has been known a technique of preparing a plurality of access paths between the computer and the storage system and switching the current access path to another access path when a trouble takes place so that the computer may keep accessed with the storage system.

For example, the patent publication 1 (JP-A-11-120092) discloses the technique of an access between a computer and a storage system that controls a storage unit provided with two or more connecting ports. When a trouble takes place in one access path to the storage unit, the storage system is being accessed by the computer through another access path so that the storage system may conceal the trouble from the computer.

Moreover, the patent publication 2 (the Official Gazette of JP-A-10-021016) discloses the technique of switching an access path between a storage system and a computer. The storage system detects a trouble occurring in an access path to a storage unit included in the storage system itself and gives back an error response for indicating use of another access path to the computer so that the computer may reissue a request for accessing another access path (referred to as a command), for switching the access path.

In the patent publication 1, the storage system may conceal a trouble occurring in the access path from the computer. To conceal the trouble, it is essential to locate in the storage system a storage unit like a buffer that temporarily saves data being transferred. This is because the device that tries to conceal the trouble is required to retry transfer of data being executed when the trouble has occurred through another access path (referred to as an alternate path).

Herein, consider the storage system like a RAID as the device to which the technique disclosed in the patent publication 1 is applied. In this case, the storage system often includes a cache memory for the purpose of improving the performance. This cache memory may be thus used as a buffer that saves a retry command and data to be transferred.

Today, however, a storage area network (often abbreviated as an SAN) of connecting a computer with a storage system has risen in this technical field. It is thus requested to supply the device composing the SAN and for relaying data (referred to as a switch) with a capability of switching an access path. In particular, in a case that the switch virtualizes a storage area of the storage system and provides the computer with one or more virtual storage systems, the switch is required to manage an access path between the switch itself and the storage system.

In this case, the application of the technique disclosed in the patent publication 1 to the switch burdens the switch with an extra memory, which results in making the overall system more costly.

In the technique disclosed in the patent publication 2, on the other hand, for realizing the switch of an access path, the storage system notices a trouble occurring in an access path to the computer and the computer reissues a command for an alternate path. Hence, the present system is required to add a capability of switching an access path to the computer. For this requirement, it is necessary to install software and the like for switching an access path in all computers connected in the network, which also results in making the overall system more costly.

SUMMARY OF THE INVENTION

It is an object of the present invention to provide an apparatus and a method which make switching of an access path possible as saving resources like a buffer without having to add a new capability to a computer.

According to an aspect of the present invention, a switch of connecting a storage unit with a computer operates to switch one access path into another.

Concretely, when the switch receives a command from the computer, the switch temporarily stores information on correspondence between the computer having issued the command and the storage unit that is the destination of the command. The correspondence information is erased when the command is completed.

Moreover, the switch determines that a trouble has occurred in the storage unit that is the destination of the command or the path to the storage unit. Then, the switch gives back an error response of the command to the computer and changes a setting so that the command may be transmitted to the concerned storage unit through an alternate path. In receipt of the error response, the computer retries to send the command to the same storage unit. The switch relays the received command to the alternate path. This is the completion of the path switching.

According to another aspect of the present invention, the switch is served as a virtual storage. When the computer transmits a command to the virtual storage, the switch served as the virtual storage operates to switch one path to another.

According to another aspect of the present invention, when reporting a command error to the computer, the error is reported only about the command(s) on which the data transfer has already started.

DETAILED DESCRIPTION OF THE EMBODIMENTS

Figure 1:
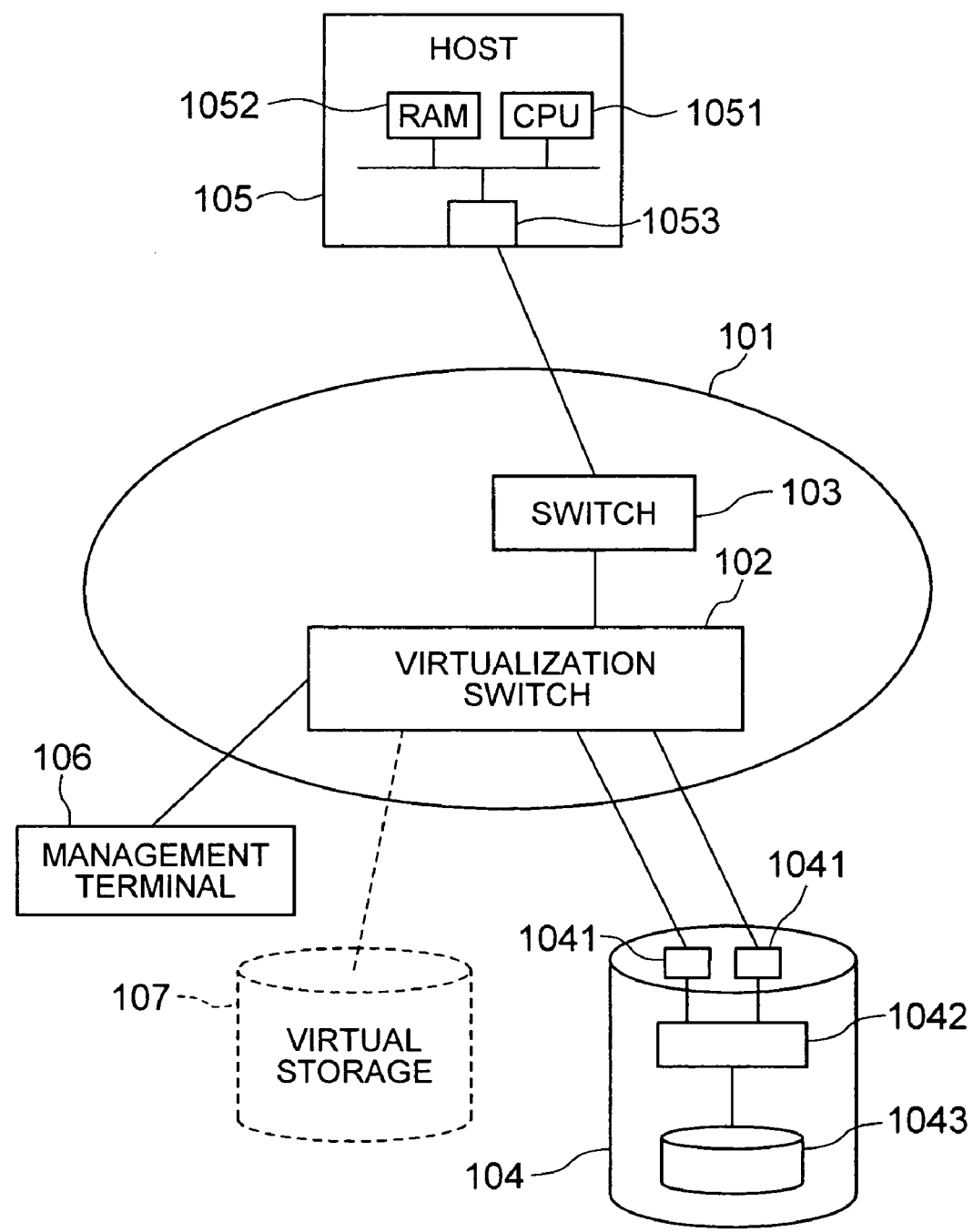
FIG. 1 is a diagram showing a computer system according to a first embodiment of the present invention.

FIG. 1 illustrates a computer system according to a first embodiment of the present invention. The computer system includes a storage unit 104, a host computer (referred simply to as a host) 105, and an SAN 101 of connecting them with one another.

The storage unit 104 may be a storage unit having a stand-alone harddisk drive and the like or a storage system having a plurality of storage units. The host 105 may be a general-purpose computer.

The SAN 101 is a network used for connecting the storage unit 104 with the host 105 so that the host 105 makes an access to the data stored in the storage unit 104. This kind of SAN 101 is arranged so that the frames configured according to the SCSI protocol may be passed in a fibre channel or an IP network and the frames may be routed through the use of the switch. The SAN 101 includes a virtualization switch 102 and a switch 103. The virtualization switch is connected with a management terminal 106. Both of the switches are connected through a communication line.

The storage unit 104 is connected with the virtualization switch 102 through dual access paths, for the purpose of avoiding a trouble such as a cut-out of a physical cable in one access path.

The virtualization switch 102 and the switch 103 include the domain addresses uniquely allocated in the SAN 101 respectively. These domain addresses are unique identifiers in the SAN 101. Further, an SAN address that is an unique identifier is allocated to each unit (storage unit 104 or the host 105) connected with the SAN 101. The SAN address is configured of the domain address and a local address, the domain address being allocated to the virtualization switch 102 or the switch 103 directly connected with the unit to which the SAN address is allocated without through another switch and the local address being a unique identifier in a group of units (referred to as a domain) connected with the switch. In addition, two or more SAN addresses may be allocated to one unit. For example, the SAN addresses may be allocated to the respective physical connection ports of a certain unit with the SAN 101. In this embodiment, the storage unit 104 has two SAN addresses, respectively.

The storage unit 104 exchanges commands, data and so forth with the host 105 at a unit called a frame. Each frame is configured of an area for saving header information and a payload. The header information includes the SAN address of a transmission source, the SAN address of a transmission destination (each of which is referred to as a source address or a destination address), and the like. The payload stores a LUN and information such as commands, data and responses to be discussed below. The LUN is a number that represents a logical storage area (referred to as a logical unit) inside the storage unit.

The virtualization switch 102 and the switch 103 are served to relay the frames (the operation of which is called frame routing) based on the destination address.

Like the other switch 103, the virtualization switch 102 performs the frame routing and supplies the host 101 with the virtual storage (referred to as a virtual storage 107). The virtual storage 107 is a set of some of the logical units included in the storage unit 104 connected with the virtualization switch 102. For changing the access to the storage area of the virtual storage 107 into the access to the logical unit included in the storage unit 104, the virtualization switch 102 includes information on correspondence between the storage area of the virtual storage 107 and the logical units of the storage unit 104.

The host 105 includes a CPU 1051, a RAM 1052, and a host bus adapter (referred to as a HBA) 1053. The CPU 1051 issues a command to the storage unit 104 or the like by transmitting to the storage unit 104 and the virtual storage 107 the frame having the command in the payload (referred to as a command frame). In this case, the host 105 adds to the header information the source address, the destination address and further a tag (referred to as a host tag).

The host tag is the information used for identifying correspondence between the data to be transferred between the storage unit 104 and the host 105 and each command issued by the host 105 in a case that the host 105 issues a plurality of commands to the same storage unit 104.

The storage unit 104 is configured of two ports 1041, a controller 1042, and a medium 1043. When the storage unit 104 receives the command frame from the port 1041, the storage unit 104 causes the controller 1042 to analyze the command and transmits and receives the frame with the data in the payload (referred to as a data frame) through the port 1041. By this operation, the storage unit 104 executes the data transfer and the read or write of the data from or on the medium 1043. The medium 1043 may be a non-volatile storage medium such as a harddisk or a DVD, or a redundant arrangement of a RAID.

Upon completion of the data transfer, the storage unit 104 gives back a response for indicating if the command is normally finished to the source having issued the command. This response is the notice of the completion of the data transferring to the host 104. The response is noticed by using the frame with the response information in the payload (referred to as a response frame). In the data frame and the response frame, the header information includes the source address, the destination address as well as the host tag contained in the data or the command frame for the response.

The host 105 having received the data frame or the response frame operates to check the host tag of the frame for the purpose of determining which of the commands corresponds with the data or the response.

Further, the management terminal 106 is a computer arranged similarly with the host 105. The manager or the user may perform settings of the virtualization switch 102 through the management terminal 106.

Figure 2:
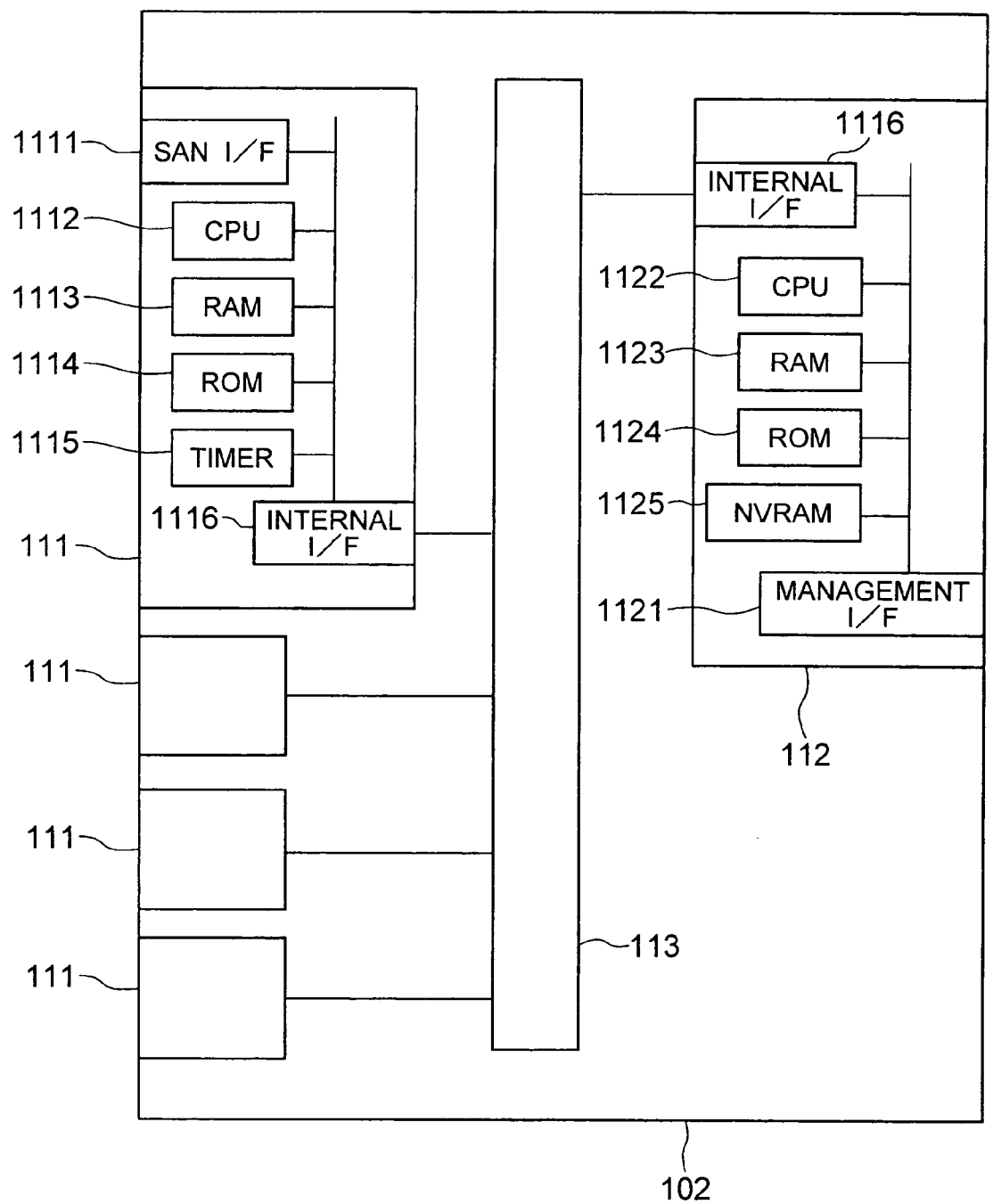
FIG. 2 is a diagram showing a virtualization switch included in the first embodiment.

FIG. 2 shows an arrangement of the virtualization switch 102. The virtualization switch 102 includes a plurality of port units 111, a management unit 112, and an internal switch 113 for connecting them with one another.

The port unit 111 is an interface used for connecting the virtualization switch 102 with the switch 102, the storage unit 104, and the host 105, each of which corresponds to the unit connected in the SAN 101 (referred to as a node). The port unit 111 includes a SAN interface 1111 being connected with another node and for transmitting and receiving the frames, a CPU 1112 for executing a program, a RAM 1113 for storing data, a ROM 1114 for storing a program, a timer 1115 for transmitting a signal to the CPU 1112 at regular intervals, and an internal interface 1116 connected with the internal switch 113. When the SAN interface 1111 receives the frame from the node connected thereto, the SAN interface 1111 operates to write the received frame in the frame transfer buffer 129 inside the RAM 1113.

The management unit 112 is an interface used for connecting the management terminal 106 with the virtualization switch 102. The management unit 112 includes a management interface 1121 connected with the management terminal 106 and for transmitting and receiving management commands and data, a CPU 1122 for executing a program, a RAM 1123 for storing data, a ROM 1124 for storing a program, a NVRAM 1125 for storing data (to be discussed below), and an internal interface 1116 being connected with the internal switch 113.

The internal switch 113 connects each port unit 111 with the management unit 112 and is served to relay the frame and a management message. The management message is a message used for exchanging configuration information between the port unit 111 and the management unit 112.

The CPU 1112 of the port unit 111 is served to transfer the frame to a frame transfer buffer 129 of the CPU 1122 of the management unit 112 through the internal interface 1116 or vice versa, and the CPU 1112 is also served to transfer a management message with the CPU 1122 or vice versa.

Each port unit 111 and the management unit 112 include their identifiers, that is, uniquely identified unit IDs inside the virtualization switch 102, for the purpose of identifying each port unit 111 and the management unit 112 inside the switch 102. The internal interface 1116 operates to transfer the frame or the management message to the corresponding port unit 111 or management unit 112 with the unit ID specified by the CPU 1112 or 1122.

The foregoing arrangement is one exemplary arrangement of the virtualization switch 102. If the same capability may be supplied, the arrangement of the virtualization switch 102 is not limited to the foregoing arrangement. For example, the CPU 1112, the RAM 1113, the ROM 11114, and the timer 1115 located in the port unit 111 may be replaced with a highly functional processor provided with the functions of those components.

In this embodiment, hereafter, the description will be concerned with the method of causing the virtualization switch 102 to detect a trouble occurring in an access path between the virtualization switch 102 and the storage unit 104 on the assumption that the host 105 makes an access to the virtual storage 107.

The operation of the virtualization switch 102 of the present invention will be summarized as follows.

The virtualization switch 102 accepts the command frame with the host tag from the host 105, record the host tag, determine the corresponding storage unit 104 with the virtual storage 107 specified by the command frame, and then transmits the command frame with the tag (which is the tag separately created by the virtualization switch 102).

In response, the storage unit 104 gives back the data frame with the tag or the response frame to the virtualization switch 102. Then, the virtualization switch 102 adds the host tag to the received frame and then gives back the result as the reply from the virtual storage 107 to the host 105. At a time, the virtualization switch 102 erases the host tag related with the replied frame from the record.

In a case that a trouble takes place in the access path between the virtualization switch 102 and the storage unit 104, for noticing the error, the virtualization switch 102 transmits to the host 105 the corresponding response frame with the host tag recorded in the switch 102. In response to this error notice, the host 105 retransmits the command frame related with the host tag. At a time, the virtualization switch 102 switches the access path in which the trouble takes place into another one. After switching the access path, when the virtualization switch 102 receives the command frame to the virtual storage 107 to the host 105, the virtualization switch 102 transmits the command frame to the storage unit 104 through the switched access path.

Hereafter, the description will be oriented to the processing of the virtualization switch 102. Beforehand, the description will be oriented to the configurations of the program and the data required for the processing of the virtualization switch 102.

Figure 3:
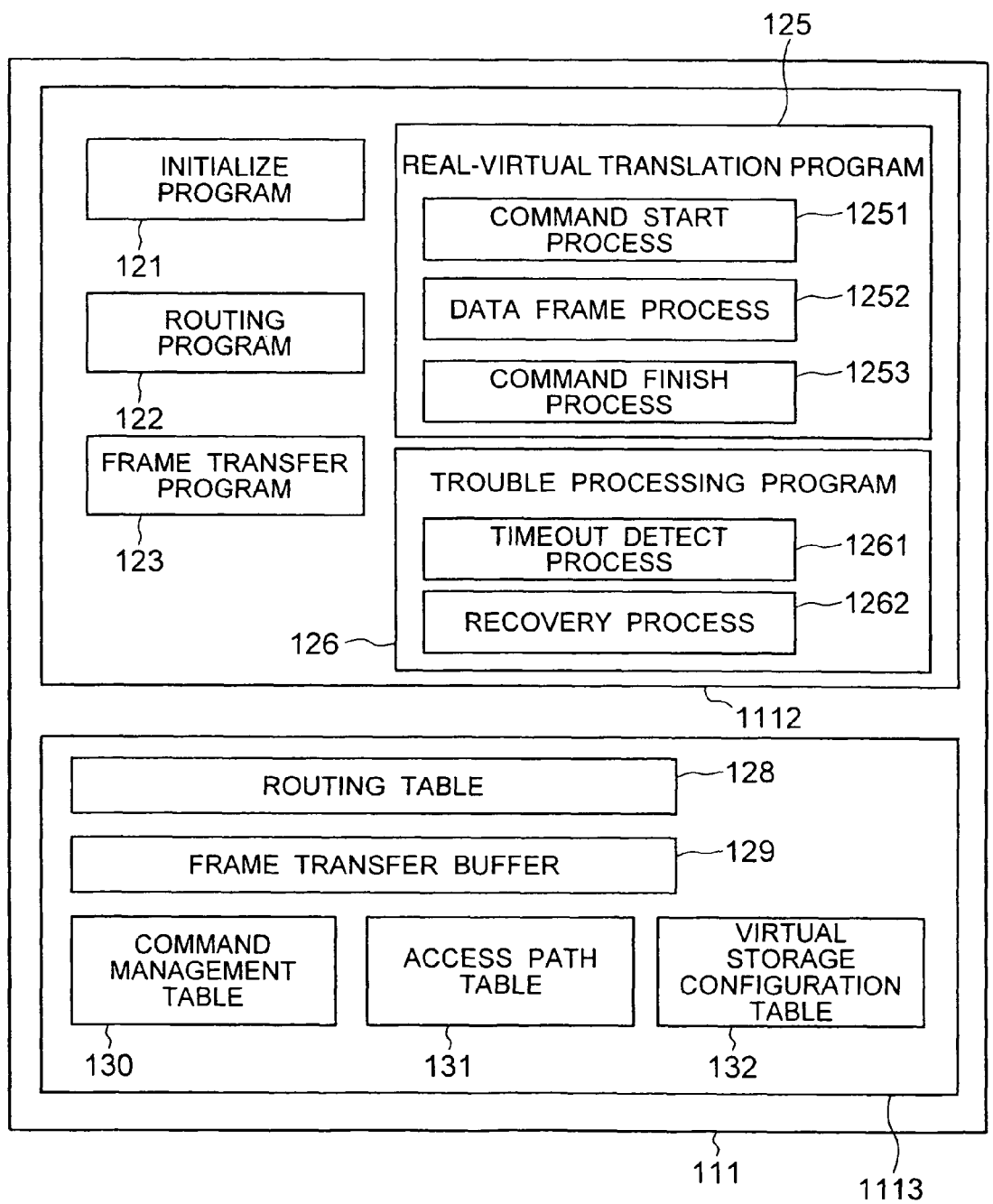
FIG. 3 is a diagram showing programs and data installed in a port unit included in the first embodiment.

FIG. 3 illustrates the configurations of the program and the data stored in the ROM 1114 of the port unit 111. The program indicated herein is executed by the CPU 1112.

The ROM 1114 stores an initialize program 121, a routing program 122, a frame transfer program 123, a real-virtual translation program 125, and a trouble processing program.

The initialize program 121 is executed by the CPU 1112 when the virtualization switch 102 is started. The CPU 1112 initializes a routing table 128, a frame transfer buffer 129, a command management table 130, an access path table 131, and a virtual storage configuration table 132, all of which will be discussed below.

The routing program 122 is executed when the CPU 1112 performs the below-described routing process for determining the unit ID of the frame destination. This routing process is performed when the SAN interface 1111 or the internal interface 1116 writes the frame in the frame transfer buffer 129. If the frame to be processed contains the SAN address of the virtual storage 107 in the destination address, the routing program 122 performs a process of invoking the real-virtual translation program 125.

The frame transfer program 123 is the program to be executed by the CPU 1112 for transferring the frames held in the frame transfer buffer 129 to another port unit 111 or the management unit 112.

The real-virtual translation program 125 is a program to be executed when the CPU 1112 performs the process of executing the command issued to the virtual storage 107. The program 125 includes as its subprograms a command start process 1251, a data frame process 1252, and a command finish process 1253.

The trouble processing program 126 is a program to be executed by the CPU 1112 in the case of detecting a trouble and recovering it if the trouble takes place in executing the command issued by the virtualization switch 102 to the storage unit 104. The trouble processing program 126 includes as its subprograms a timeout detect process 1261 and a recovery process 1262. Based on the signal from the timer 1115, the CPU 1112 periodically executes the timeout detect process 1261 and detects a timeout of the command issued by the virtualization switch 102 to the storage unit 104. The timeout indicates that a time between the issuance of the command by the virtualization switch 102 to the storage unit 104 and the reception of the corresponding response to this command is equal to or longer than a predetermined time. The CPU 1112 having detected the timeout executes the recovery process 1262 for recovering the trouble.

The routing table 128 is a table required when the CPU 1112 performs the routing process. The contents of the table will be discussed below.

The frame transfer buffer 129 is a storage area secured in the RAM 1113 and is served as a buffer for temporarily saving the frames to be processed by the CPU 1112.

The command management table 130 is a table to be used when the CPU 1112 executes the real-virtual translation program 124 and the trouble processing program 126.

The access path table 131 is a table used for managing the storage unit 104 used by the virtualization switch 102 at each access path for providing the virtual storage 107.

The virtual storage configuration table 132 is a table used for managing correspondence between the virtual storage 107 and the access path.

Figure 4:
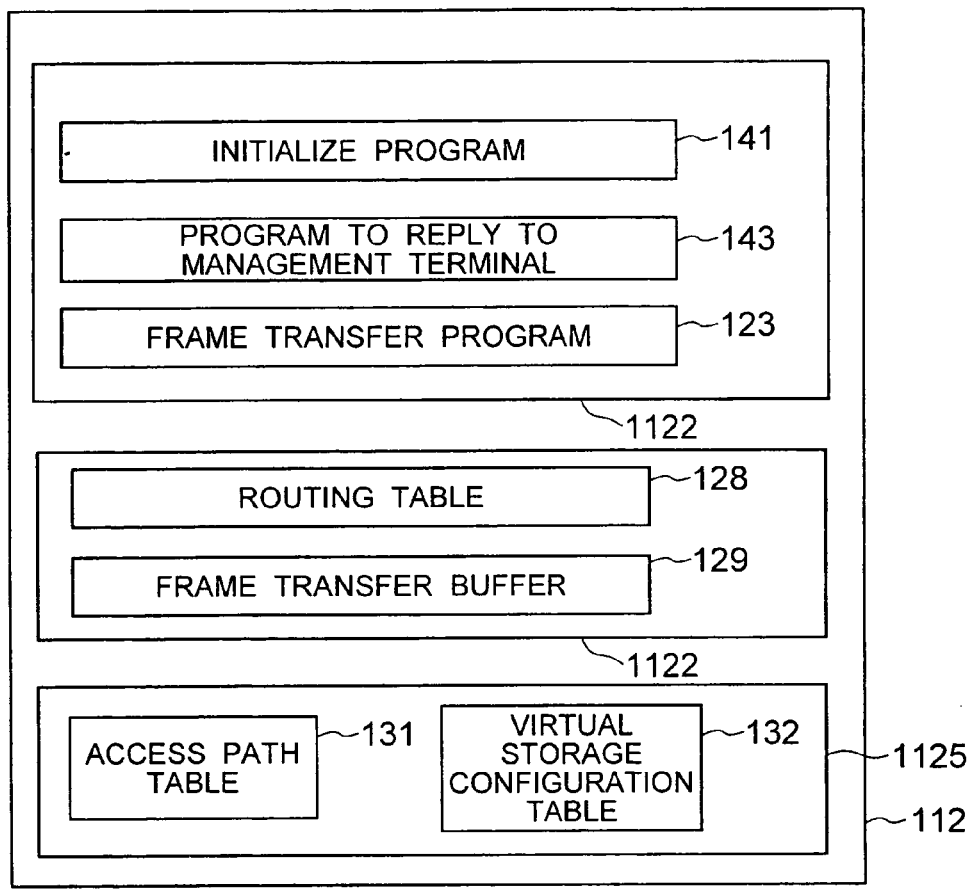
FIG. 4 is a diagram showing programs and data installed in a management unit included in the first embodiment.

FIG. 4 illustrates the configurations of the programs and the data stored in the ROM 1124 and the NVRAM 1125 of the management unit 112.

The ROM 1124 stores an initialize program 131, a program to reply to management terminal 143, and a frame transfer program 123.

The initialize program 141 is executed by the CPU 1122 at the start of the virtualization switch 102. The CPU 1122 initializes the routing table 128 and the frame transfer buffer 129 and registers the corresponding entry with the virtual storage 107 in the routing table 128 based on the content of the virtual storage configuration table 132.

The program to reply to management terminal 143 is executed when the CPU 1122 changes the access path table 131 and the virtual storage configuration table 132 and then changes the routing table 128 according to the former change in response to the request issued by the management terminal 106 through the management interface 1121.

The NVRAM 1123 stores the routing table 128 and the frame transfer buffer 129 and the NVRAM 1125 stores the access path table 131 and the virtual storage configuration table 132, those components of which are the same as those of the port unit 111.

Figure 5:
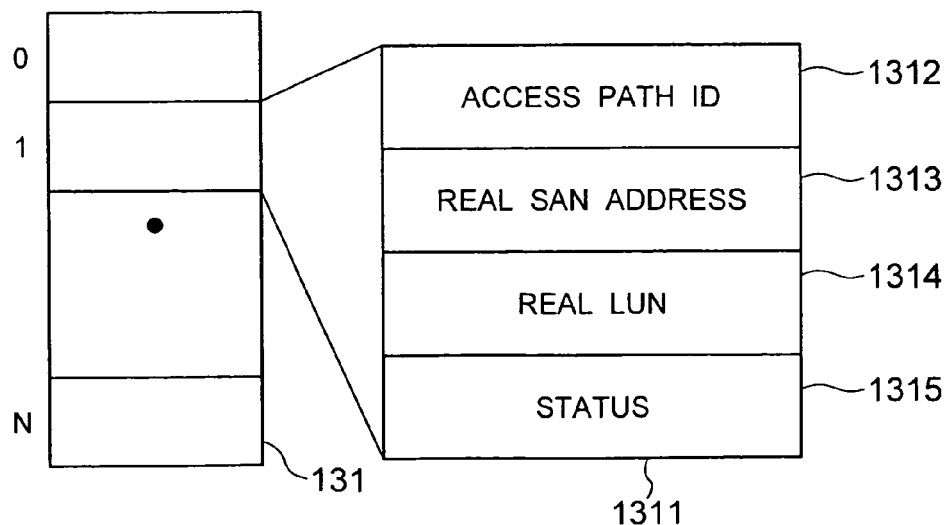
FIG. 5 is a diagram showing an access path table included in the first embodiment.

FIG. 5 illustrates an exemplary configuration of the access path table 131. The access path table 131 includes a plurality of access path entries 1311.

In one access path entry 1311 registered the information on one access path to the storage area of the storage unit 104 used for supplying the virtual storage 107. Concretely, each access path entry 1311 includes a field 1312 where an access path ID set by the management terminal 106 is to be stored, a field 1313 where information on a SAN address of the storage unit 104 (referred to as a real SAN address) is to be registered, a field 1314 where information on the LUN of the storage unit 104 (referred to as a real LUN) is to be registered, and a field 1315 where information on a status for indicating if the access path to the storage unit 104 specified by the entry 1131 is usable is to be registered.

If the value of the information to be registered in the field 1315 is 1, the access path specified by the entry is usable, while if the value is 0, it is not be usable.

Figure 6:
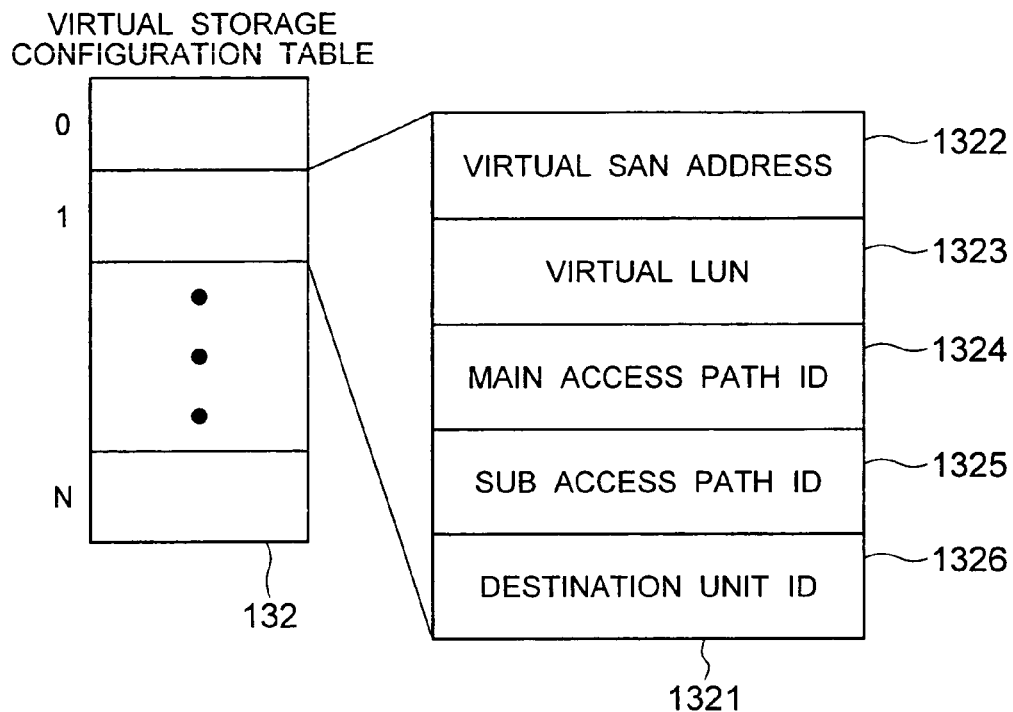
FIG. 6 is a diagram showing a virtual storage configuration table included in the first embodiment.

FIG. 6 illustrates an exemplary arrangement of the virtual storage configuration table 132.

The table 132 is configured of a plurality of virtual storage entries 1321. One virtual storage entry 1321 is a connection to the SAN 101 of the virtual storage 107, concretely, corresponds with the SAN address assigned to the virtual storage 107.

Each virtual storage entry 1321 includes a field 1322 where information on the SAN address assigned to the virtual storage 107 (referred to as a virtual SAN address) is to be registered, a field 1323 where information for indicating a number of the logic unit included in the virtual storage (referred to as a virtual LUN) is to be registered, a field 1324 where an ID for indicating a main access path (referred to as a main access path ID) is to be registered, a field 1325 where an ID for indicating a sub access path (referred to as a sub access path ID) is to be registered, and a field 1326 where an ID for indicating a destination unit (referred to as a destination unit ID) is to be registered.

The virtual SAN address is configured of a domain address of the virtualization switch 102 and a local address specified by the management terminal 106. The virtual LUN is specified by the management terminal 106.

The main access path represents an access path to the storage unit 104 in a normal condition. The sub access path represents an access path to the storage unit 104 when a trouble takes place. Both of the access paths are used by the virtualization switch 102 and have their IDs to be specified by the management terminal 106.

The destination unit ID represents a port unit 111 that executes the corresponding command to the virtual storage 107 with the concerned entry 1321. The unit ID is specified by the management terminal 106.

Figure 7:
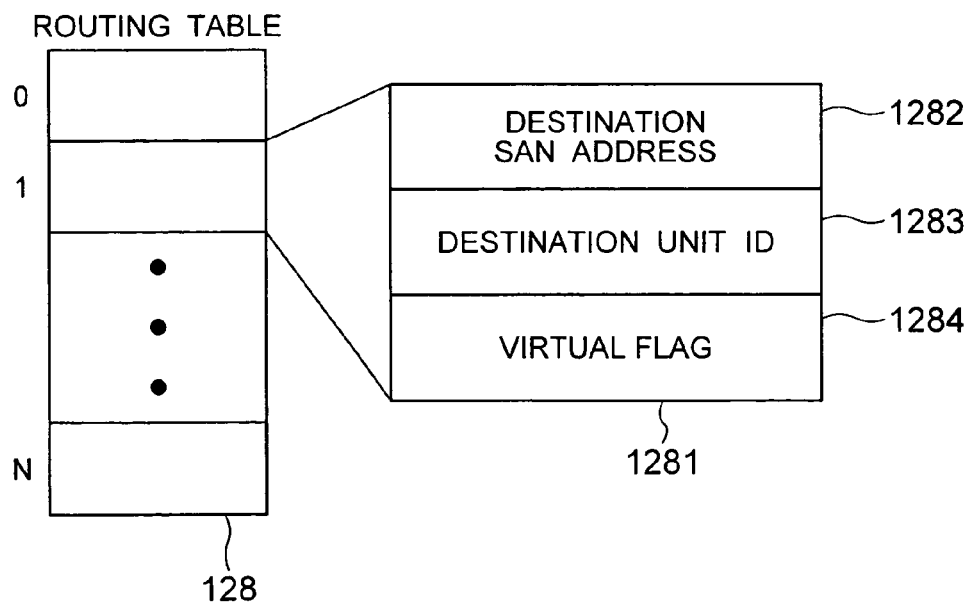
FIG. 7 is a diagram showing a routing table included in the first embodiment.

FIG. 7 illustrates an exemplary configuration of the routing table 128.

The routing table 128 includes a plurality of routing entries 1281.

Each routing entry 1281 represents correspondence between the destination address contained in the frame and the unit ID of the port unit 111 to which the frame is to be transferred. Each routing entry 1281 includes a field 1281 in which the destination SAN address corresponding to the destination address is to be registered, a field 1283 in which the destination unit ID for representing the port unit 111 or the management unit 112 where the frame having the destination address registered in the field 1282 is to be transferred is to be registered, and a field 1283 in which a virtual flag for indicating if the destination address of the corresponding frame with the concerned entry corresponds with the virtual storage 107 is to be registered.

If the virtual flag to be registered in the field 1283 indicates a value of 1, the concerned entry corresponds with the SAN address for the virtual storage 107, while if it indicates a value of 0, the concerned entry corresponds with the node connected with the SAN interface 1116 of the port unit 111. The management unit 112 adds a combination of the destination SAN address and the destination unit ID corresponding with the entry registered in the virtual storage configuration table 132 to the routing table 128 by setting the virtual flag to 1.

Figure 9:
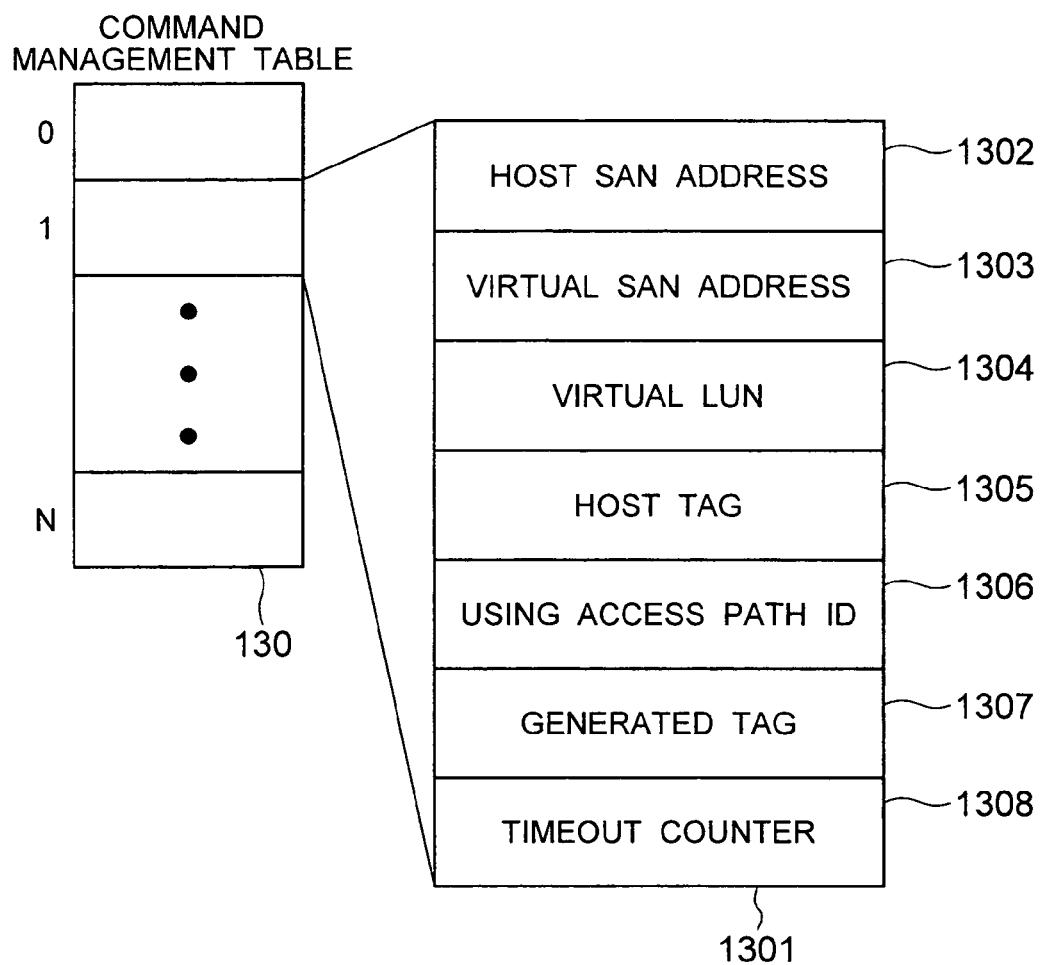
FIG. 9 is a diagram showing a command management table included in the first embodiment.

FIG. 9 illustrates an exemplary configuration of the command management table 130.

The command management table 130 includes a plurality of command management entries 1301. Each command management entry 1301 corresponds with each command issued by the host 105 to the virtual storage 107. Each command management entry 1301 includes a field 1302 in which a host SAN address is to be registered, a field 1303 in which the virtual SAN address is to be registered, a field 1304 in which the virtual LUN is to be registered, a field 1305 in which a host tag contained in the command is to be registered, a field 1306 in which a using access path ID is to be registered, a field 1307 in which a generated tag is to be registered, and a field 1308 to be used as a timeout counter.

The host SAN address represents a SAN address of the host 105 that issues a command. In the field 1303 is to be registered the virtual SAN address of the virtual storage 107 that corresponds to the destination of the command frame. In the field 1304 is to be registered the LUN of the virtual storage 107 specified by the command frame.

In the field 1305 is to be registered the value of the host tag contained in the header of the command frame issued by the host 105. The using access path ID means an access path ID determined by the command start process to be discussed below. The generated tag means a tag to be used for the command frame issued by the virtualization switch 102 to the storage unit 104. The generated tag is generated in the command registration process to be discussed below.

The timeout counter indicates a value to be used for detecting a timeout of the concerned command in the timeout detection process to be discussed below. If the timeout counter indicates a value of −1, the value means the command management entry 1301 is invalid.

Hereafter, the description will be oriented to the processing of the frame in the virtualization switch 102. When routing the received frame to the predetermined node, the virtualization switch 102 determines if the destination of the frame is the virtual storage 107 and performs the real-virtual translation process. In the following description, the port unit 111 for the real-virtual translation to be executed by the virtualization switch 102 is predetermined, and the corresponding destination unit ID with the virtual SAN address to be registered in the routing table 128 is assumed to be the unit ID for specifying the port unit 111 for the real-virtual translation.

Figure 8:
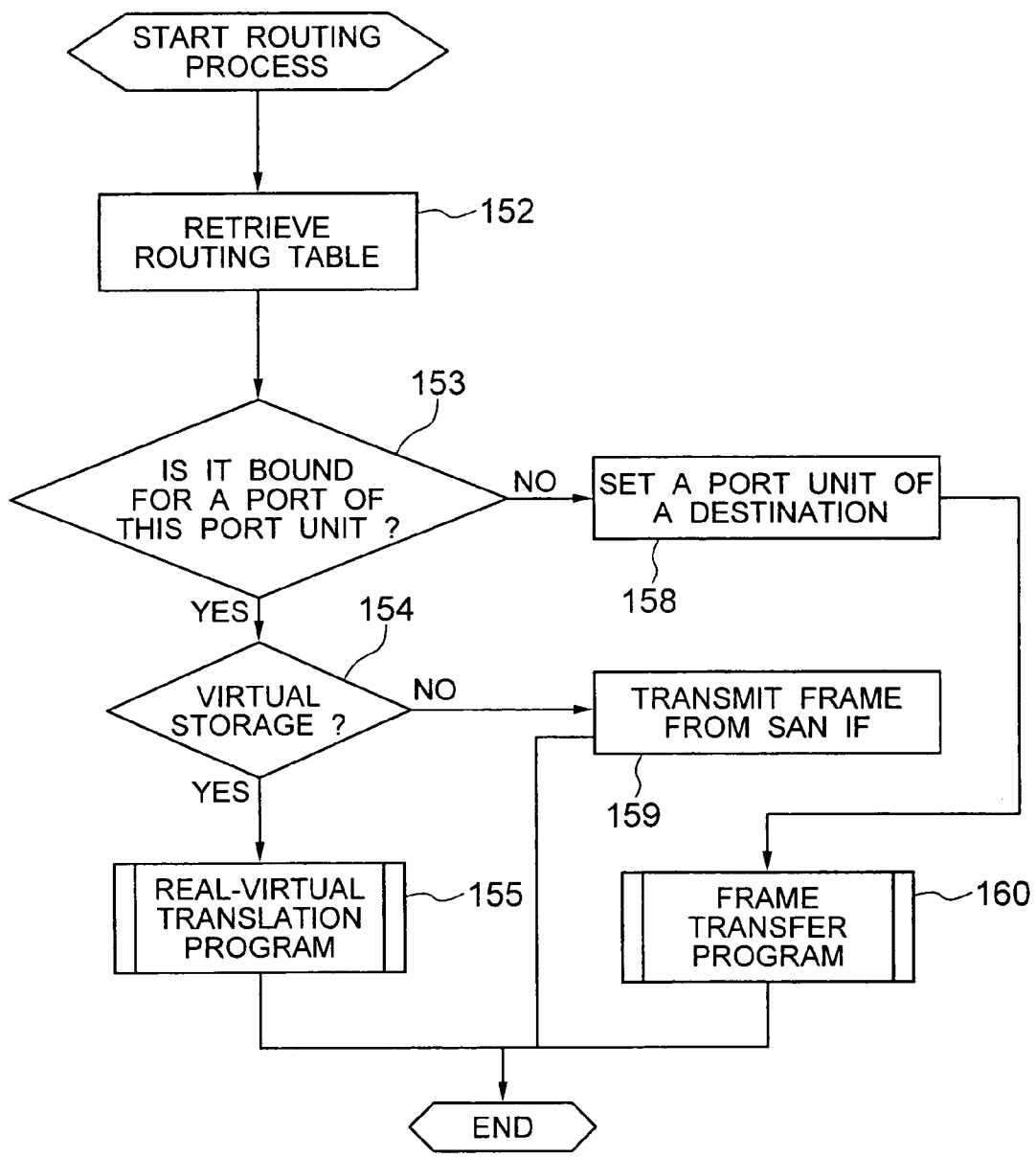
FIG. 8 is a flowchart showing a routing process included in the first embodiment.

FIG. 8 is a flowchart showing a routing process in the port unit 111 for the real-virtual translation.

This routing process is executed when the SAN interface 1111 of the port unit 111 receives the frame and then writes it in the frame transfer buffer 129 or when the frame is transferred from another port unit 111.

At first, the port unit 111 selects the routing entry 1281 in which the destination address of the frame is matched to the destination SAN address 1282 from the routing table 128 (step 152).

Then, the port unit 111 determines if the destination unit ID registered in the field 1283 of the routing entry 1281 selected in the step 152 is matched to the unit ID of the port unit 111 that is executing the present routing process (step 153).

If matched, the port unit 111 determines if the virtual flag registered in the field 1283 of the routing entry 1281 selected in the step 152 indicates a value of 1 (step 154). If it indicates a value of 1, the port unit 111 executes the real-virtual translation program 125 so that the frame destination may be translated from the virtual storage 107 to the storage unit 104 or the host 105 and the destination-translated frame may be transferred to the storage unit 104 or the host 105. Concretely, the port unit 111 transfers the frame to another port unit 111 connected with the destined storage unit 104 or host 105. The details of the real-virtual translation process will be described below (step 155).

If, in the step 153, the destination unit ID registered in the field 1283 is not matched to the unit ID of the port unit 111 that is executing the present routing process, the port unit 111 sets to the destination of the frame the destination unit ID registered in the field 1283 of the routing entry 1281 selected in the step 152 (step 158).

If, in the step 154, the virtual flag indicates a value of 0, the port unit 111 transmits the target frame to the unit specified by the destination SAN address through the SAN interface 1111, and then finishes the process (step 159).

After the operation of the step 158, the port unit 111 executes the frame transfer program 123, transfers the target frame to another unit in response to the destination unit ID specified in the step 158, and then finishes the process (step 160).

If the port unit 111 does not execute the real-virtual translation process, the operations of the steps 154 and 155 are removed from the present routing process. If, in the step 153, the port unit 111 determines that the frame is destined to itself, the port unit 111 executes the operation of the step 159.

In turn, the description will be oriented to the details of the real-virtual translation process to be executed by the port unit 111. The real-virtual translation process is divided into three processes, that is, a command start process of translating a command frame to be transferred from the host 105 to the virtual storage 107 into the command frame to be transferred from the host 105 to the storage unit 104, a data frame process of translating a destination of a data frame received from the host 105 or the storage unit 104, and a command end process of translating a destination of a response frame received from the storage unit 104. The port unit 111, which started the real-virtual translation process in the step 155 of the foregoing routing process, performs the foregoing three processes according to the contents of the received frame. Hereafter, these three processes will be described in detail.

Figure 10:
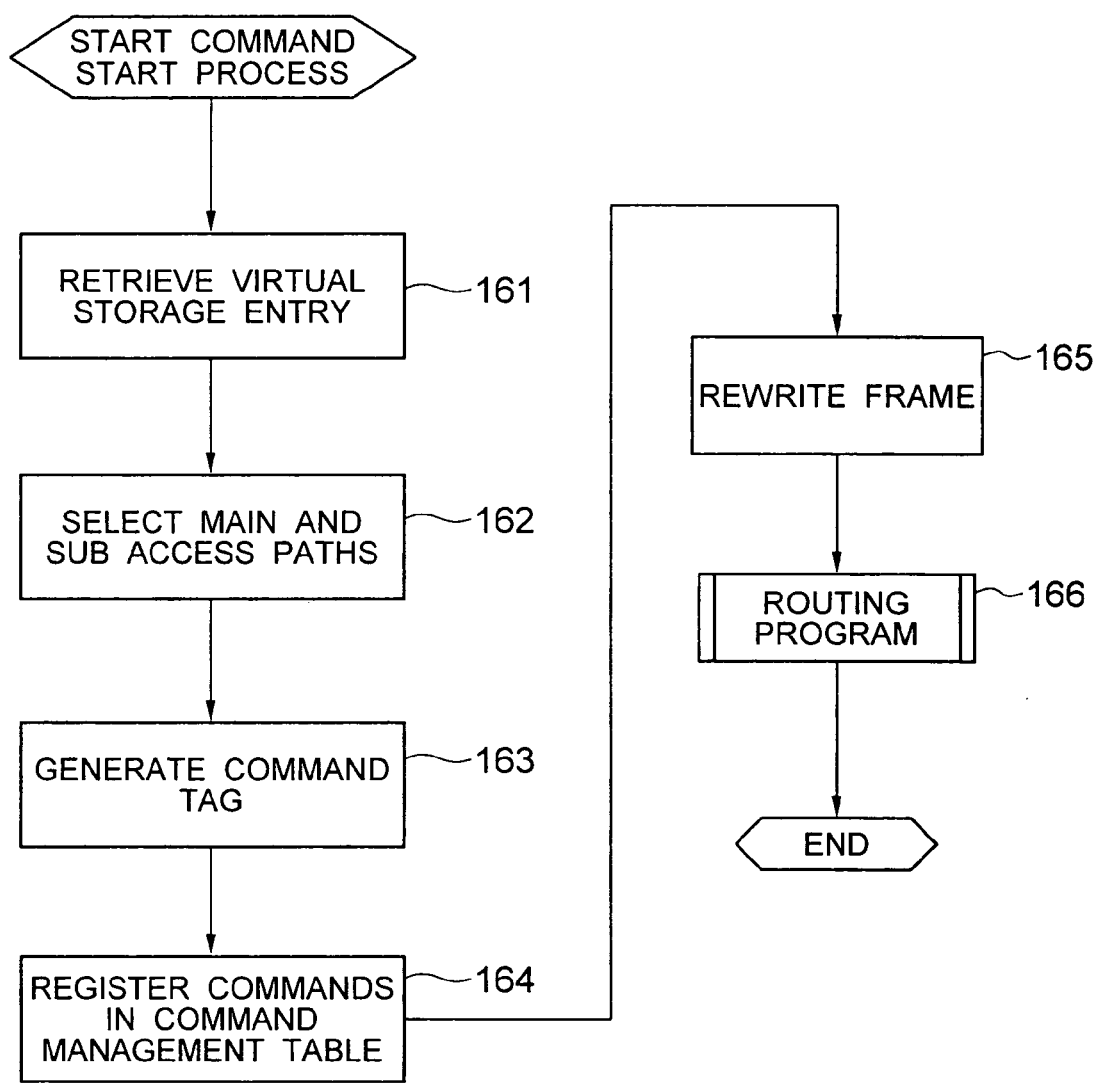
FIG. 10 is a flowchart showing a process of starting a command included in the first embodiment.

FIG. 10 is a flowchart showing the command start process 1251 to be executed by the port unit 111.

At first, the port unit 111 selects from the virtual storage configuration table 132 the virtual storage entry 1321 in which the destination address of the received command frame is matched to the virtual SAN address (step 161).

Then, the port unit 111 selects the main access path or the sub access path, both of which are registered in the fields 1324 and 1325 of the virtual storage entry 1321 selected in the step 161. Concretely, the port unit 111 selects from the access path table 131 the corresponding access path entry 1311 with the registered main access path and then checks the status registered in the field 1315 of the entry 1311. If the status indicates a value of 1, the main access path is selected, while if it does not indicate a value of 1, the corresponding access path entry 1311 with the sub access path is selected from the access path table 131 (step 162).

Afterwards, the port unit 111 generates the tag (referred to as the generated tag) to be added to the command to be issued to the corresponding storage unit 104 with the access path entry 1311 selected in the step 162. This generated tag is prohibited to have the same value as any one of the generated tags registered in the field 1307 of any valid command management entry 1301 of the command management table 130 (step 163).

Then, the port unit 111 registers the target command in the command management table 130. Concretely, the port unit 111 selects one invalid command management entry 1301 from the command management table 130 and then enters the source address, the destination address, the LUN, the host tag, all of which are contained in the target command frame, the access path ID of the access path entry 1311 selected in the step 162, and the tag value generated in the step 163 into the fields 1302, 1303, 1304, 1305, 1306, and 1307 of the selected entry 1301, respectively. Further, the timeout counter of the field 1308 is set to zero (0) (step 164).

Next, the port unit 111 rewrites the header information of the target command frame and the LUN contained in the payload. Concretely, the port unit 111 rewrites the source address, the destination address, the LUN, and the host tag value, all of which are contained in the command frame, into the destination address (that is, the SAN address of the virtual storage 107) of the target command frame, the real SAN address of the access path entry 1311 selected in the step 162, the real LUN, and the tag value generated in the step 163, respectively (step 165).

Then, the port unit 111 executes the routing program 122, transfers the command frame translated in the step 165 into the predetermined storage unit 104, and then finishes the process (step 166).

Figure 11:
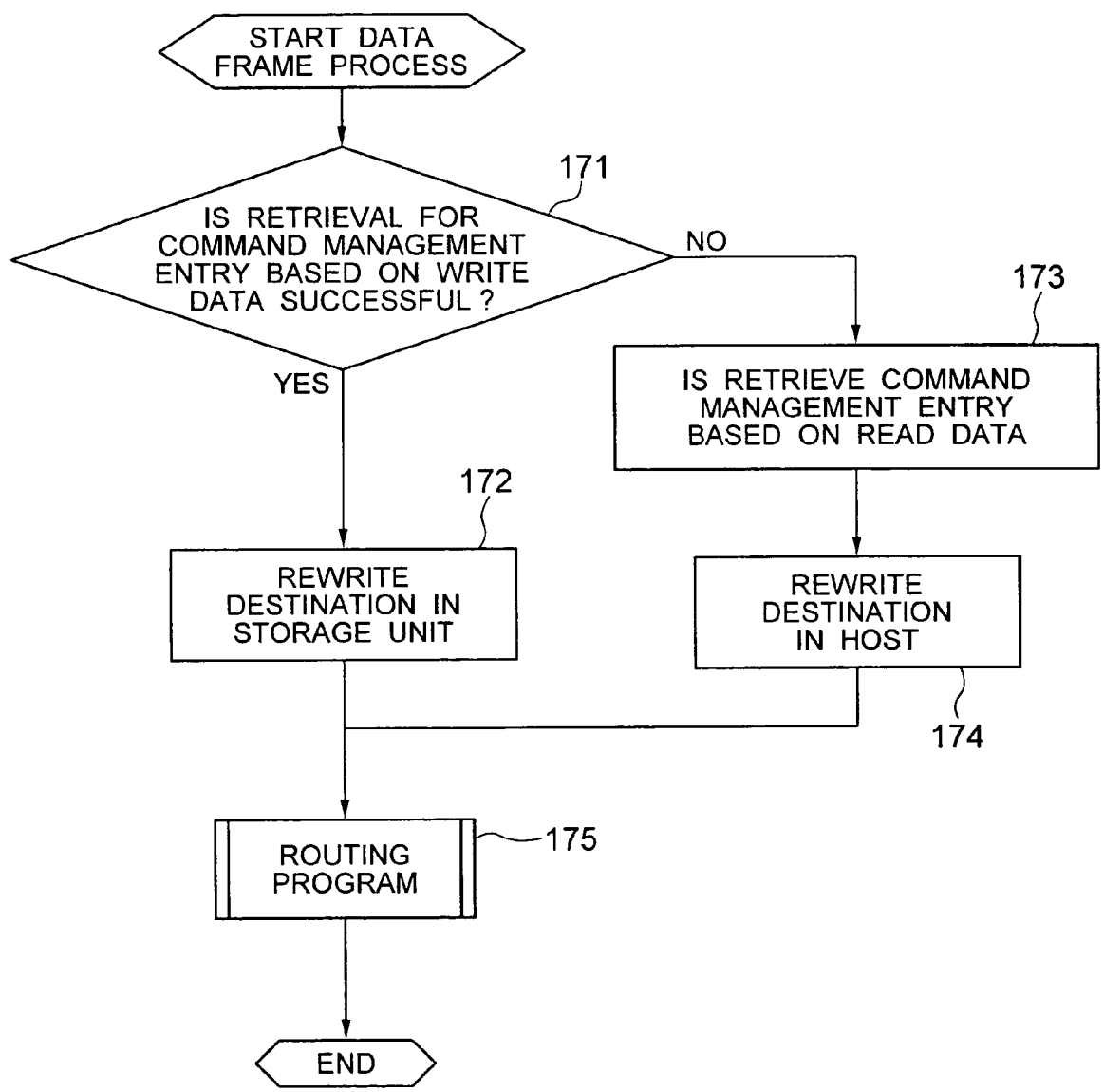
FIG. 11 is a flowchart showing a data frame process included in the first embodiment.

FIG. 11 is a flowchart showing a data frame process 1252 to be executed by the port unit 111.

At first, the port unit 111 retrieves from the command management table 130 the command management entry 1301 in which the source address, the destination address, and the tag of the received data frame are matched to the values registered in the fields 1302, 1303 and 1305 (step 171).

If the command management entry 1301 with the matched values is found, the port unit 111 selects from the access path table 131 the corresponding access path entry 1311 with the using access path ID registered in the field 1306 of the selected command management entry 1301. Then, the port unit 111 rewrites the header information of the received data frame. Concretely, the port unit 111 rewrites the source address, the destination address, and the tag of the received data frame into the virtual SAN address registered in the field 1303 of the command management entry 1301 selected in the step 171, the real SAN address registered in the field 1313 of the access path entry 1311 selected in this step, and the generated tag value registered in the field 1307 of the command management entry 1301 selected in the step 171, respectively (step 172).

If no matched command management entry 1301 is found in the step 171, the port unit 111 selects from the command management table 130 the command management entry 1301 in which the destination address and the tag of the received data frame are matched to the values registered in the fields 1303 and 1307 (step 173).

Then, the port unit 111 rewrites the header information of the received data frame. Concretely, the port unit 111 rewrites the source address, the destination address, and the tag of the data frame into the virtual SAN address registered in the field 1303 of the command management entry 1301 selected in the step 171, the host SAN address registered in the field 1302, and the host tag registered in the field 1305, respectively (step 174).

The port unit 111, which has finished the operations of the step 172 or 174, executes the routing program 122, transfers the data frame rewritten in the step 172 or 174 to the predetermined node (the host 105 or the storage unit 104), and finishes the process (step 175).

Figure 12:
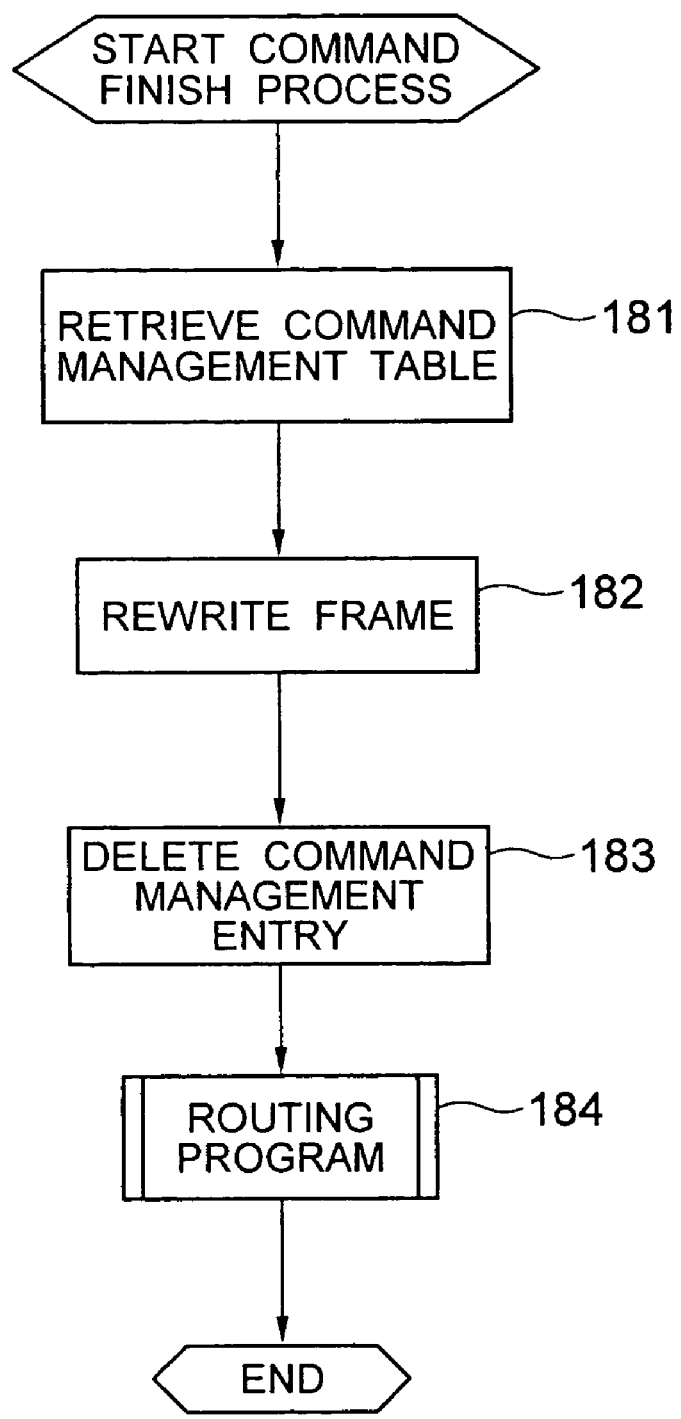
FIG. 12 is a flowchart showing a process of ending a command included in the first embodiment.

FIG. 12 is a flowchart showing a command finish process 1253 to be executed by the port unit 111.

At first, the port unit 111 selects from the command management table 130 the command management entry 1301 in which the destination address and the generated tag of the received response frame are matched to the values registered in the fields 1303 and 1307 (step 181).

Afterwards, the port unit 111 rewrites the header information and the LUN of the response frame. Concretely, the port unit 111 rewrites the source address, the destination address, and the generated tag of the response frame into the virtual SAN address registered in the field 1303 of the command management entry 1301 selected in the step 181, the host SAN address registered in the field 1302, and the host tag registered in the field 1305, respectively (step 182).

Then, the port unit 111 sets the value of the timeout counter of the field 1308 to a value of −1 for nullifying the command management entry 1301 selected in the step 181 (step 183).

Lastly, the port unit 111 executes the routing program 122, transfers the response frame rewritten in the step 182 to the host 105, and then finishes the process (step 184).

The foregoing process makes it possible for the virtualization switch 102 to execute the real-virtual translation process and thereby process the frame related with the virtual storage 107.

In turn, the description will be oriented to the process of causing the virtualization switch 102 to detect an access path between the virtualization switch 102 and the storage unit 104 and to use an alternate path. If the virtualization switch 102 detects no response to the command transmitted to the storage unit 104 a certain length of time later, the virtualization switch 102 starts the process of using the alternate path. The former process is called a timeout detection process, while the latter process is a recovery process. Both of these processes will be described below. In addition, these two processes are executed by the port unit 111 that has a role of executing the real-virtual translation process.

Figure 13:
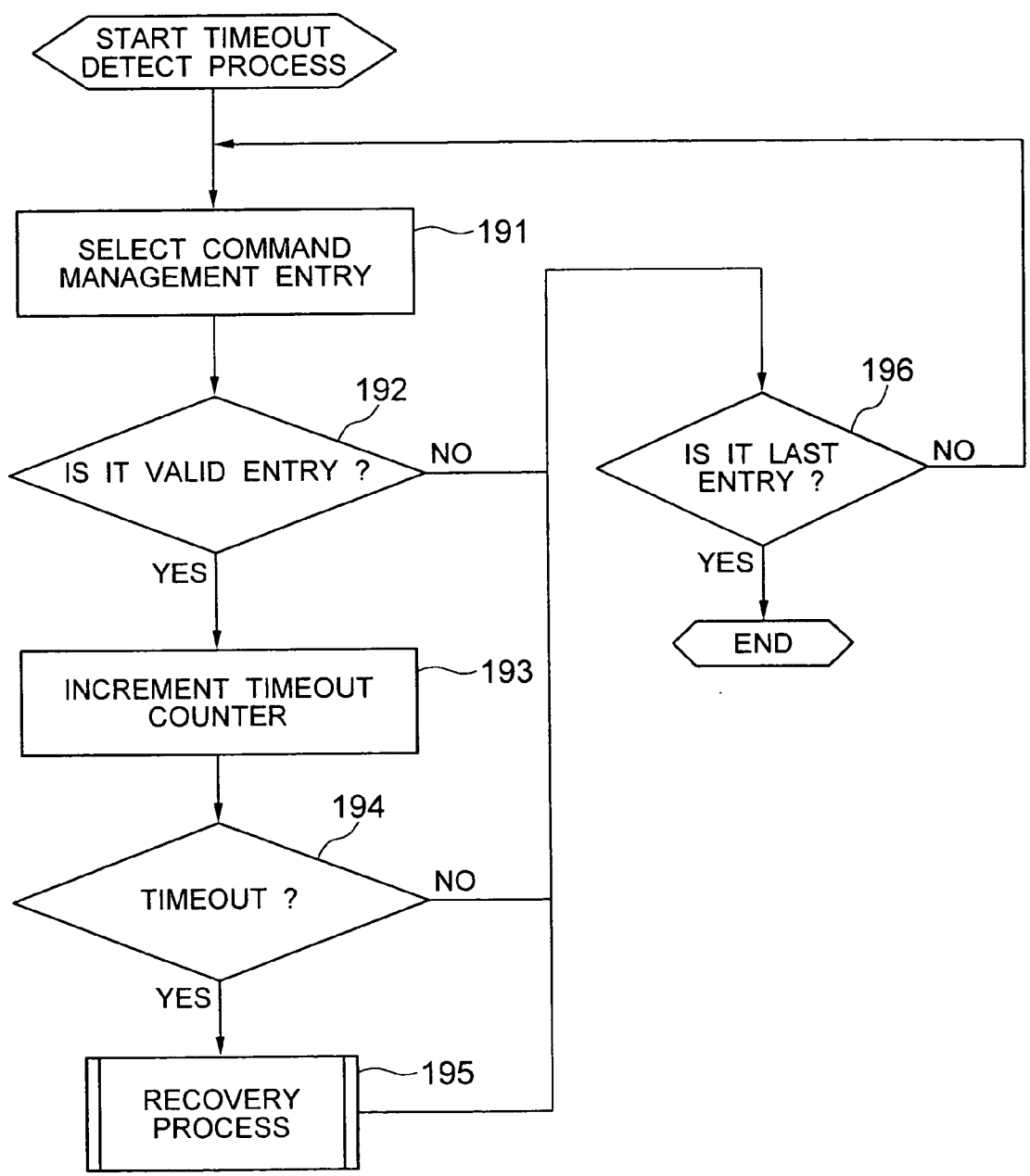
FIG. 13 is a flowchart showing a process of detecting a timeout included in the first embodiment.

FIG. 13 is a flowchart showing a timeout detection process 1281 to be executed by the port unit 111. The CPU 1112 periodically executes this process in response to the signal sent from the timer 1115.

At first, the port unit 111 selects the head command management entry 1301 from the command management table 130. If the operation of the step 191 is executed second or later, the port unit 111 selects the next command management entry 1301 to the command management entry 1301 executed at the just previous time (step 191).

Then, the port unit 111 determines if the command management entry 1301 selected in the step 191 is valid. Concretely, the port unit 111 determines if the entry 1301 is valid by checking if the timeout counter of the field 1308 indicates a value of −1 (step 192). If the entry 1301 is valid, the port unit 111 increments the value of the timeout counter registered in the field 1308 of the command management entry 1301 selected in the step 191 (step 193).

Then, the port unit 111 determines if the value of the timeout counter is equal to a specific constant on which the timeout is to be determined (step 194).

If the timeout is determined in the step 194, the port unit 111 starts the recovery process. The recovery process will be described below in detail (step 195).

If, in the step 192, the entry 1301 is determined to be invalid, if, in the step 194, the entry 1301 is not determined to reach the timeout, or if, in the step 195, the recovery process is finished, the port unit 111 determines if the command management entry 1301 selected in the step 191 is the last entry of the command management table 130. If it is the last one, the port unit 111 finishes the process, while if it is not, the port unit 111 goes back to the step 191 and repeats the process about the next entry 1301 (step 196).

Figure 14:
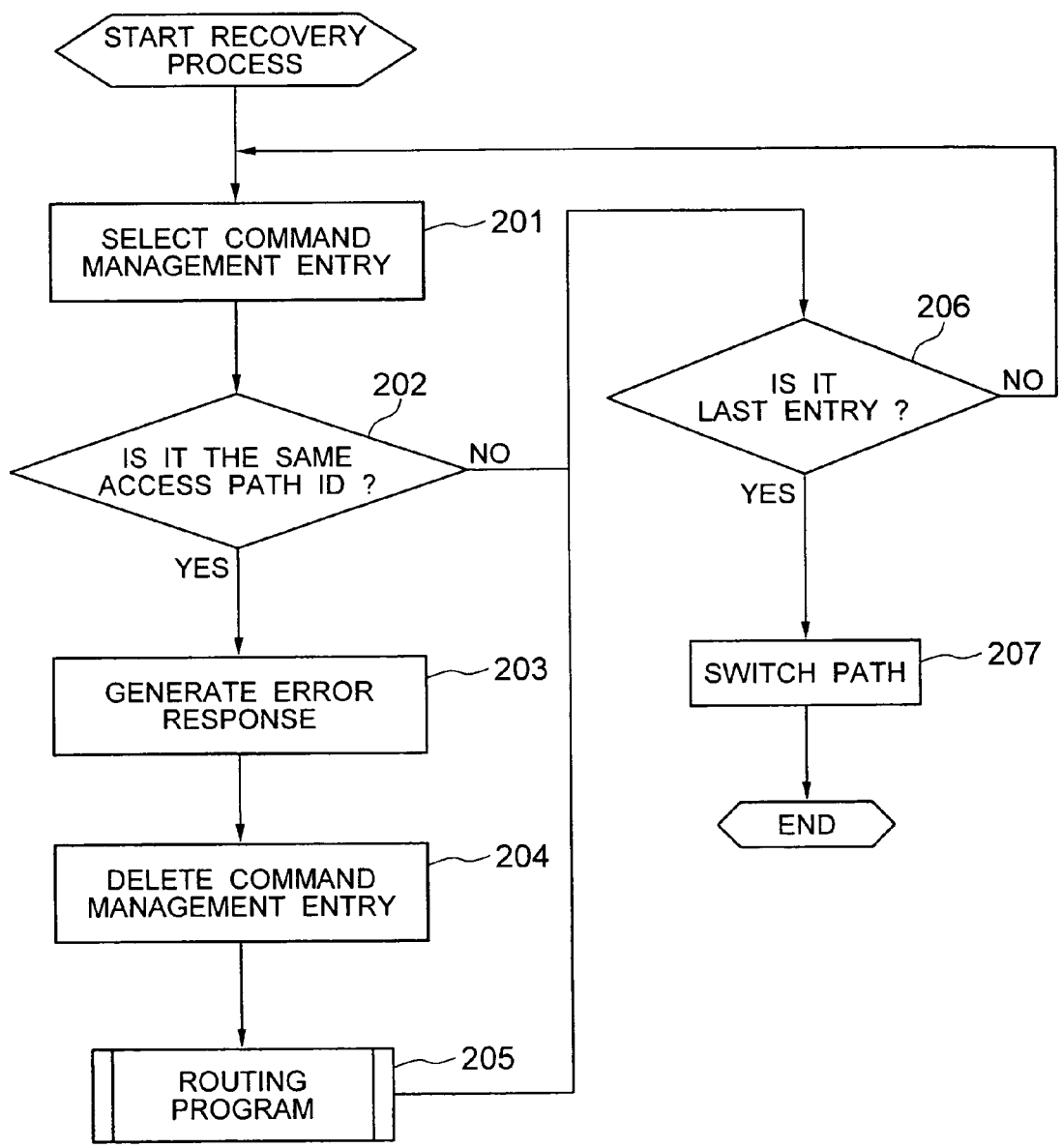
FIG. 14 is a flowchart showing a recovery process included in the first embodiment.

FIG. 14 is a flowchart showing the recovery process to be executed by the port unit 111.

At first, the port unit 111 selects the head command management entry 1301 from the command management table 130. If the operation of the step 191 is executed second time or later, the port unit 111 selects the next command management entry 1301 to the command management entry 1301 executed at the just previous time (step 201).

Then, the port unit 111 determines if the command management entry 1301 selected in the step 201 has the same using access path ID as that registered in the field 1306 of the entry 1301 determined as a timeout in the step 194 of the timeout detection process having been described with reference to FIG. 13 (step 202).

If the selected entry 1301 has the same using access path ID as the entry 1301 determined as a timeout, the port unit 111 generates a response frame for an error response to the corresponding command with the command management entry 1301 selected in the step 201. Concretely, the port unit 111 sets the virtual SAN address registered in the field 1303 of the command management entry 1301 selected in the step 201, the host SAN address registered in the field 1302, and the host tag registered in the field 1305 to the source address, the destination address, and the tag of each response frame, respectively. The contents of the response are to request the host 105 to retry the command (step 203).

Afterwards, the port unit 111 sets a timeout counter of the field 1308 to a value of −1 for nullifying the command management entry 1301 selected in the step 201 (step 204).

After the entry 1301 is nullified, the port unit 111 executes the routing program 122 and then transfers the response frame generated in the step 203 to the host 105 (step 205).

After the operation of the step 205 is finished or if the entry 1301 selected in the step 202 does not have the same using access path ID as that of the entry 1301 determined as a timeout, the port unit 111 determines if the command management entry 1301 selected in the step 201 is the last entry of the command management table 130. If it is not the last entry, the port unit 111 repeats the process of the step 201 or later (step 206).

If the selected entry 1301 is the last entry of the command management table 130, the port unit 111 selects from the access path table 131 the access path entry 1311 in which the using access path ID specified in the step 194 of FIG. 13 is matched to the access path ID and sets the status of the field 1315 to a value of 0. Then, the port unit 111 finishes the process (step 207).

According to the present embodiment, when the data or the response to the command transmitted to the SAN address of the storage unit 104 used in a normal mode is not transmitted from the storage unit 104 to the virtualization switch 102 because of a cut-out of a physical connection between the virtualization switch 102 and the storage unit 104, the virtualization switch 102 enables to detect a timeout of the command and transmit the error response of requesting the host 105 to retry the command.

In parallel to the foregoing process, the virtualization switch 102 nullifies the corresponding access path entry 1311 with the main access path ID. Hence, the subsequent commands to the virtual storage 107 are all processed through the sub access path ID. When, therefore, the host retries to transmit the command to the virtual storage 107, the virtualization switch 102 transmits the command to the other SAN address of the storage unit 104 through the sub access path ID. This makes it possible for the host 105 to continuously access the virtual storage 107.

According to this embodiment, the virtualization switch 102 detects a trouble occurring in the path between the virtual switch 102 and the storage unit 104 by detecting a timeout. Instead of this method, when the virtualization switch 102 is physically connected with the storage unit 104, the virtualization switch 102 enables to detect a trouble occurring in the storage unit 104 or the like based on change of an electric signal or disappearance of a light signal. In this case, the port unit 111 having detected the trouble transmits the management message to the management unit 112. In response, the management unit 112 transmits the management message to each port unit 111. Each port unit 111 detects the occurrence of the trouble from the management message and may execute the recovery process.

Further, in this embodiment, the virtualization switch 102 offers the virtual storage 107. In place, one path may be shared by the virtual storage 10 and the storage unit 104. That is, the virtualization switch 102 does not necessarily offer the virtual storage 107. In this case, the path switching process is made possible.

Hereafter, the description will be oriented to a computer system according to the second embodiment of the present invention. This computer system has the same arrangement as the computer system of the first embodiment except that the virtualization switch 102 is replaced with the virtualization switch 302 to be discussed below.

According to the first embodiment, the virtualization switch 102 notifies the host 105 of the error response to all commands about the concerned virtual storage 107 when a timeout is detected. According to the second embodiment, on the other hand, the virtualization switch 302 gives back the error response to only the command(s) on which the data has been already transferred to the host 105. As to the other commands, the virtualization switch 102 retransmits the command frames to the storage unit 104 through another path. The use of the virtualization switch 302 makes it possible to reduce the number of the commands to be retried by the host 105. Later, the description will be oriented to the different portion of the second embodiment from the first embodiment.

The virtualization switch 302 has the same arrangement as the virtualization switch 102. However, the routines of the command start process 1251, the data frame process 1252 and the recovery process 1262 and the configuration of the command management table 130 are somewhat different.

Figure 15:
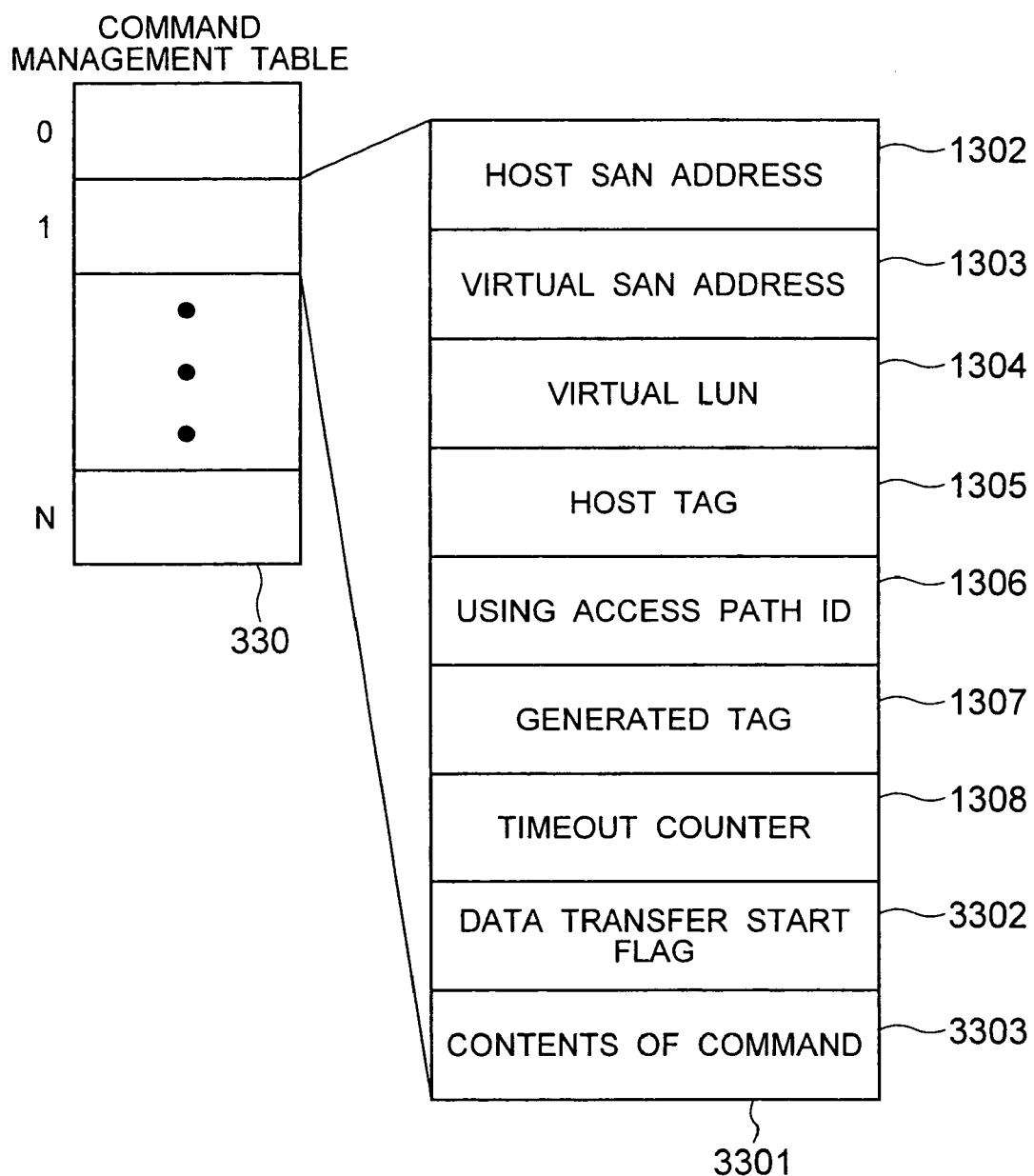
FIG. 15 is a diagram showing a command management table included in a second embodiment of the present invention.

FIG. 15 shows an exemplary configuration of the command management table 330.

The command management table 330 is configured of a plurality of command management entries 3301. The command management entry 3301 includes a field 3302 in which a data transfer start flag is to be registered and a field 3303 in which the contents of command are to be registered in addition to the command management entry 1301 included in the first embodiment.

The data transfer start flag is a flag that indicates if the virtualization switch 102 has heretofore received the data frame about the concerned command. If the data transfer flag indicates a value of 0, it means that the virtualization switch 102 did not receive any data frame in the past, while if it indicates a value of 1, it means that the switch 102 has received any data frame.

The contents of command mean the contents of a command(s) contained in the payload of the command frame transmitted by the host 105 to the virtual storage 107.

In the command start process 1251 included in this embodiment, the foregoing operation of the step 183 additionally includes an operation of causing the port unit 111 to set the data transfer flag of the field 3302 of the command management entry 3301 to a value of 0 and to save the contents of the command in the field 3303.

In the data frame process 1252, the foregoing operations of the steps 172 and 173 additionally include an operation of causing the port unit 111 to set the data transfer flag of the field 3302 of the command management entry 3301 used thereby.

Figure 16:
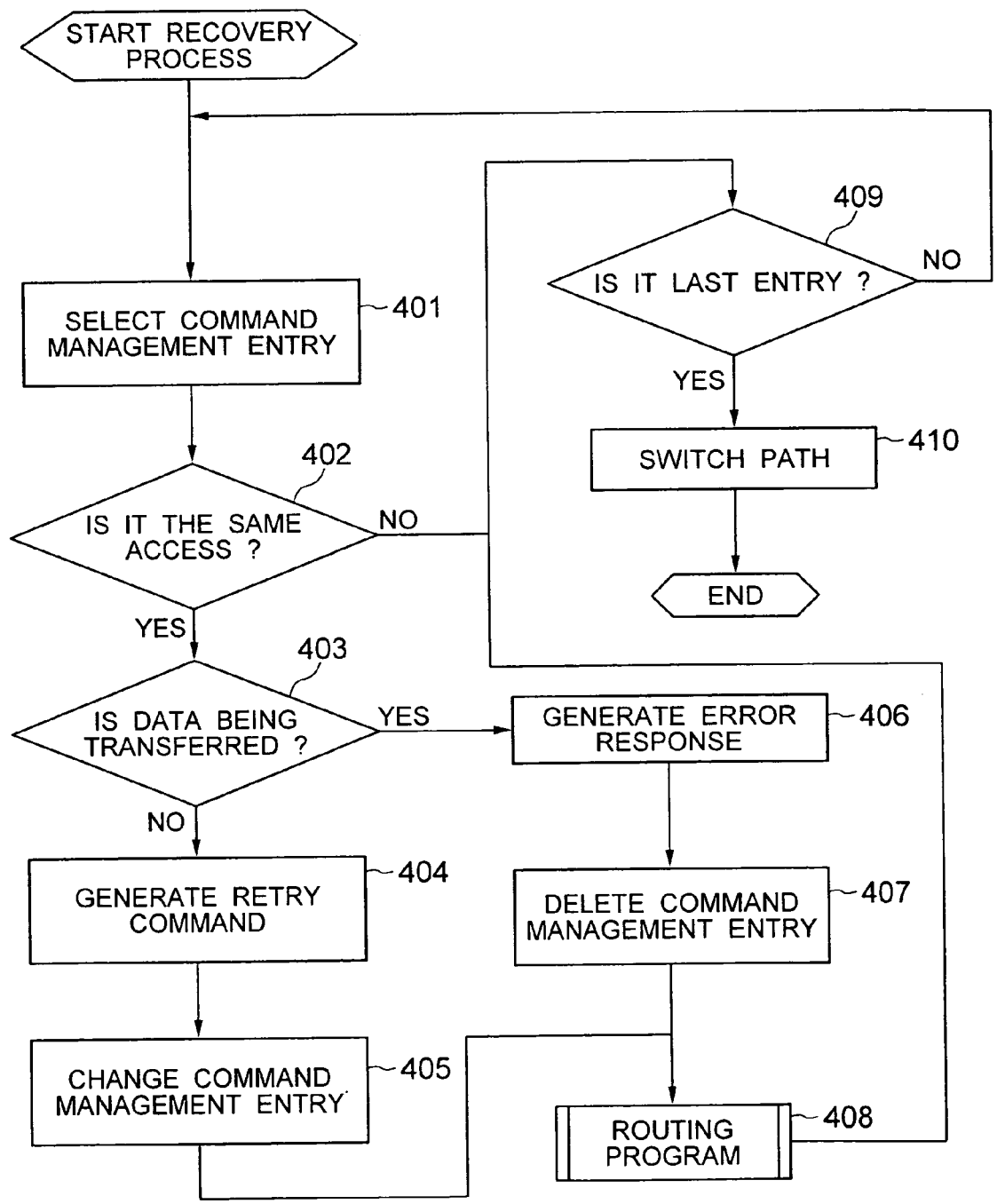
FIG. 16 is a flowchart showing a recovery process included in the second embodiment.

FIG. 16 is a flowchart showing the recovery process 1262 of the port unit 111 according to this embodiment of the invention.

At first, the port unit 111 performs the same operation as that of the step 201 shown in FIG. 14 (step 401).

Then, the port unit 111 performs the same determination as the operation of the step 202 (step 402).

If the selected entry 3301 has the same using access path ID as the entry 3301 determined as a timeout, the port unit 111 determines if the transfer start flag registered in the field 3302 of the command management entry 3301 selected in the step 401 indicates a value of 1 (step 403).

If the transfer start flag indicates a value of 0, the port unit 111 generates a command to be reissued to an alternate path through the use of the command management entry 3301 selected in the step 401. Concretely, the port unit 111 selects from the virtual storage configuration table 132 the virtual storage entry 1321 having the fields 1322 and 1323 matched to the fields 1303 and 1304 of the command management entry 3301. Then, the port unit 111 selects from the access path table 131 the access path entry 1311 having the access path ID matched to the sub access path ID registered in the field 1325 of the selected entry 1321.

Then, the port unit 111 specifies the virtual SAN address of the field 1302 of the command management entry 3301 selected in the step 401, the real SAN address of the field 1313 of the access path entry 1311 selected in the step 404, the real LU of the field 1314, the generated tag of the field 1307 of the command management entry 3301 selected in the step 401, and the contents of command in the field 3303 as the source address, the destination address, the LUN, the generated tag, and the command of the command frame to be generated, respectively (step 404).

Afterwards, the port unit 111 changes the value of the field 1306 of the command management entry 3301 selected in the step 401 into the value registered in the field ID 1312 of the access path entry 1311 selected in the step 404 and then sets the timeout counter of the field 1308 to a value of 0 (step 405).

On the other hand, if, in the step 403, the data transfer start flag indicates a value of 1, the port unit 111 performs the same operations as those of the steps 203 and 204 shown in FIG. 14 (steps 406 and 407).

After the operation of the step 405 or 407, the port unit 111 executes the routine program 122 and then transfers the command frame generated in the step 404 and the response frame generated in the step 406 to the storage unit 104 or the host 105 (step 408).

After the operation of the step 408 is finished or if the entry 3301 selected in the step 402 is determined not to have the same using access path ID as the entry 3301 determined as a timeout, the port unit 111 performs the same operations as those of the steps 206 and 207 shown in FIG. 14 and then finishes the process (steps 409 and 410).

The difference between the virtualization switch 302 of this embodiment and the virtualization switch 102 of the first embodiment is the recovery process for the command on which the data is not still transferred.

Concretely, irrespective of whether or not the data transfer is started, the virtualization switch 102 transmits to the host 105 the error response to the command determined as a timeout.

On the other hand, the virtualization switch 302 of this embodiment records the data transfer start flag for determining if the data transfer is started and the contents of each command in the command management entry 3301. Hence, as to the command on which the data transfer is not still started, the virtualization switch 302 retransmits the command to the other SAN address of the storage unit 104 without giving back an error response to the host 105. This makes it possible to reduce the number of commands to be retried by the host 105.

In turn, the description will be oriented to the computer system according to a third embodiment of the present invention.

In the following description, the computer system of this embodiment has the differently arranged virtualization switch from those of the first and the second embodiments though the former switch offers the same capability as the latter ones. This embodiment indicates that the overall resources of the virtualization switch may be reduced in number.

Figure 17:
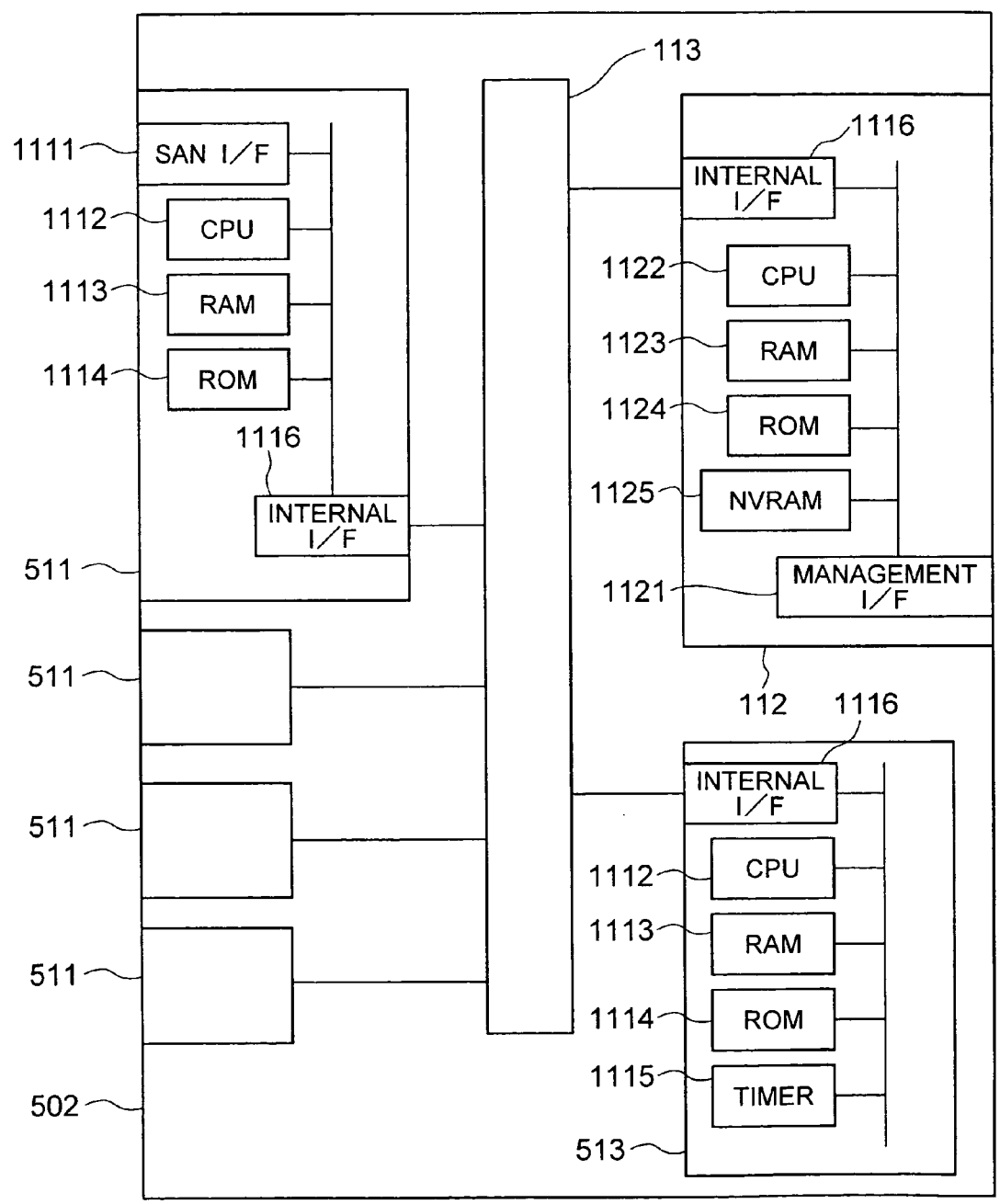
FIG. 17 is a diagram showing a virtualization switch according to a third embodiment of the present invention.

FIG. 17 shows an exemplary arrangement of the virtualization switch 502 included in this embodiment. The difference between the virtualization switch 502 and the virtualization switch 102 included in the first embodiment is as follows. First, the port unit 511 of this embodiment does not include the timer 1115, which is included in the port unit 111 of the first embodiment. Second, a new virtualization unit 513 is added to the arrangement. The unit 513 corresponds to the port unit 111 from which the SAN interface 1111 is removed.

The port unit 511 stores in a ROM 1114 the same programs and data as those stored in the ROM 1114 of the port unit 111 excepting the real-virtual translation program 125, the trouble processing program 126, the command management table 130, the access path table 131, and the virtual storage configuration table 132.

Further, the configuration of the programs and data stored in the virtualization unit 513 is the same as that of the port unit 111.

In the virtualization switch 502 of this embodiment, the virtualization unit 513 offers the virtual storage 107. By arranging the switch 502 in this manner, that is, separating the ordinary frame routing process from the process about the virtual storage 107, the port unit 511 may save the load of the CPU 1112 and the capacity of the RAM 1113 more than those of the port unit 111 and thereby exclude the timer 1115. In place, the virtualization switch 502 is required to have the virtualization unit 513 as a new component. If the virtualization switch 502 provides lots of port units 513, the switch 502 arranged as described above makes it possible to save the resources of the switch 502 more than the switch 102.

Likewise, the recovery process of the virtualization switch 302 of the second embodiment may be implemented by the arrangement of virtualization 502 of this third embodiment.

In addition, the process to be executed by the foregoing programs may be realized by the dedicated hardware.

The present invention offers a switch for switching a path without having to use a buffer or a cache for transferring data or without having to add a new capability to the computer in a network of connecting the storage unit with the computer.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A virtualization switch being connected with a plurality of storage units and a computer, said switch being connected with said storage units through a plurality of communication paths, comprising:
   a plurality of interfaces being connected with said storage units or said computer; and
   an internal switch for connecting said plurality of interfaces with one another;
   a management table having information about a virtual logical unit number (virtual LUN) of a virtual storage, a LUN, a first communication path of said communication paths, a second communication path of said communication paths, and a data transfer starting information of a command, said virtual LUN being used to virtually represent a position of said LUN in said storage units for said computer and relay a command, sent from said computer to said virtual LUN, to said LUN, said first communication path being used if trouble does not occur in said first communication path and said second communication path being used if trouble occurs in said first communication path;
   wherein a first interface of said plurality of interfaces receives a command for data transfer from said computer to said virtual storage, records an identifier for identifying said command, transfers said command to said LUN in said storage units through a first communication path of said plurality of communication paths based on said management table, detects, in response to said command , a trouble occurring in said first communication path, records a starting of said data transfer upon said command with said recorded identifier, transmits, if a starting of a data transfer has been recorded, a frame for noticing an error of said received command to said computer if starting of said data transfer has not been recorded, creates a new data transfer upon said command by using said LUN corresponding to said virtual LUN without transmitting said frame for noticing said error and transfers a command to said LUN in said storage units through said second communication path.

2. A virtualization switch as claimed in claim 1, wherein said first interface determines a trouble occurs in said first communication path if no response to said command having been transmitted to said storage units is received a certain length of time later.

3. A virtualization switch as claimed in claim 1, wherein said first interface detects a trouble occurring in said first communication path by determining a cut-out of a physical connection with said storage units.

4. A virtualization switch as claimed in claim 1, wherein said first interface provides said computer with a virtual storage and, if a command from said computer to said virtual storage is received, translates said command to said virtual storage into a command to said storage units.

5. A method of transferring a frame in a virtualization switch connected with a plurality of storage units and a computer through a plurality of communication paths, comprising the steps of:
   managing, in a management table, information about a virtual logical unit number (virtual LUN) of a virtual storage, a LUN, a first communication path of said communication paths, a second communication path of said communication paths, and a data transfer starting information of a command, said virtual LUN being used to virtually represent a position of said LUN in said storage units for said computer and relay a command, sent from said computer to said virtual LUN, to said LUN, said first communication path being used if trouble does not occur in said first communication path and said second communication path being used if trouble occurs in said first communication path;
   receiving a command for data transfer from said computer to said virtual storage, recording an identifier for indicating said received command, then transferring said command to said LUN in said storage units through a first communication path of said plurality of communication paths based on said management table;
   detecting, in response to said command, a trouble occurring in said first communication path;
   recording a starting of said data transfer upon said command with said recorded identifier;
   transmitting, if a starting of said data transfer has been recorded, a frame for noticing an error of said received command to said computer if starting of said data transfer has not been recorded; and
   creating a new data transfer upon said command by using said LUN corresponding to said virtual LUN without transmitting said frame for noticing said error, and transferring into said LUN in said storage units a command to be received from said computer through a second communication path of said plurality of communication paths.

* * * * *